United States Patent [19]

Frost et al.

[11] 3,899,326

[45] Aug. 12, 1975

[54] METHOD OF MAKING MONOLITHIC HONEYCOMBED STRUCTURES

[75] Inventors: Rodney I. Frost; Louis M. Holleran, both of Corning, N.Y.

[73] Assignee: Corning Glass Works, Corning, N.Y.

[22] Filed: Mar. 30, 1973

[21] Appl. No.: 346,606

[52] U.S. Cl. ............... 75/214; 75/200; 264/57; 264/67; 264/111; 264/118; 264/125; 264/177 R
[51] Int. Cl.² ............... B22F 3/12; B28B 21/52
[58] Field of Search .......... 75/214, 200; 264/57, 63, 264/67, 111, 118, 125, 177 R, 209; 156/244

[56] References Cited
UNITED STATES PATENTS

| | | | |
|---|---|---|---|
| 2,014,269 | 9/1935 | Barbour | 264/57 |
| 3,274,315 | 9/1966 | Kawamura | 264/177 R X |
| 3,467,570 | 9/1969 | Baxter et al. | 264/177 R X |
| 3,496,035 | 2/1970 | Foerster | 75/214 X |
| 3,790,654 | 2/1974 | Bagley | 264/177 R |

*Primary Examiner*—Benjamin R. Padgett
*Assistant Examiner*—R. E. Schafer
*Attorney, Agent, or Firm*—Richard N. Wardell; Clarence R. Patty, Jr.; Robert B. Washburn

[57] ABSTRACT

A method of making an extruded, monolithic, honeycombed structure of ceramic or other sinterable material without delaminating, cracking or slumping. During extrusion and firing and the interim therebetween, the axis of an extruded honeycombed structure is positioned substantially horizontally with the cell walls oriented so as to maximize the vertical support provided by the cell walls. The vertical support is maximized by orienting the honeycombed structure such that series of interconnected cell walls extending from one surface of the structure to another extend in a generally vertical direction with the minimum horizontal projection.

7 Claims, 11 Drawing Figures

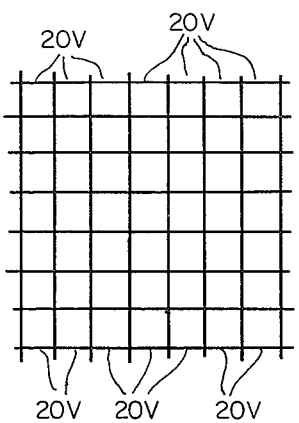
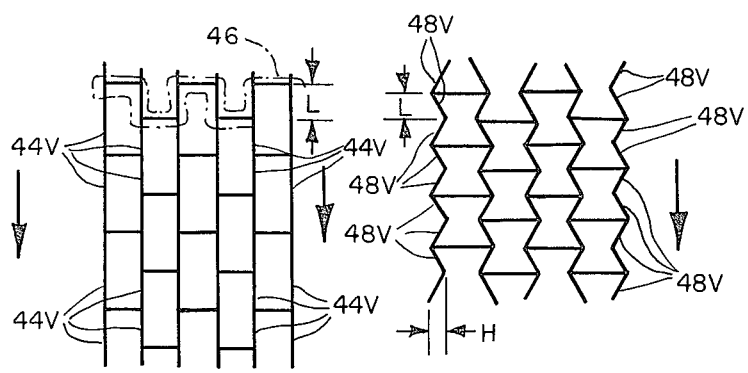
Fig. 3  Fig. 4  Fig. 5
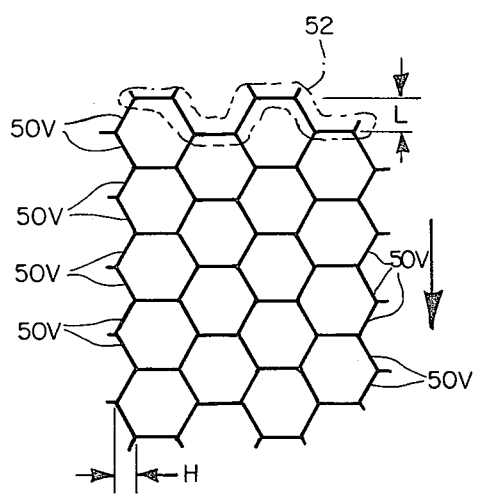
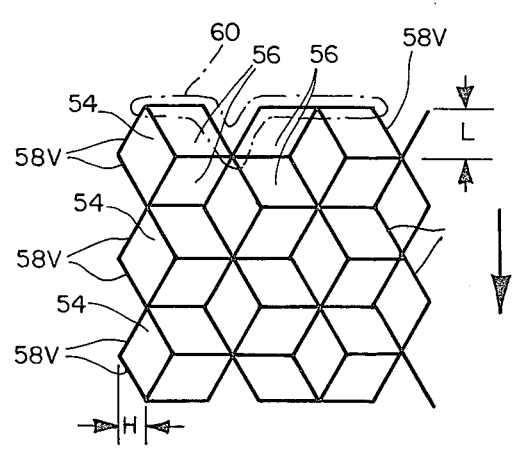
Fig. 6  Fig. 7
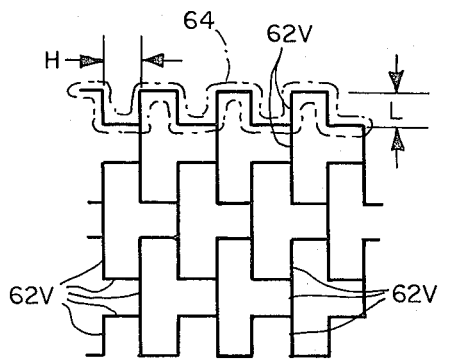
Fig. 8

METHOD OF MAKING MONOLITHIC HONEYCOMBED STRUCTURES

BACKGROUND OF THE INVENTION

This invention relates to the art of manufacturing extruded honeycombed articles from an extrudable material such as particulate ceramic and/or metallic batches, and similar sinterable materials which have the property of flow or plastic deformation during extrusion while having some inherent rigidity immediately thereafter to assist in maintaining structural integrity. In general, these articles are characterized by a monolithic honeycombed structure having a multiplicity of open-ended, continuous cells which extend along the extrusion axis from one open end of the structure to the other.

Various difficulties have been encountered in handling the honeycombed structures while they are in the green state. More specifically, it has been found that the structures are subject to delaminating, cracking and/or slumping, especially during firing. If a green structure is permitted to be supported on its open face to minimize slumping, i.e., the cells extend vertically with respect to the plane of the supporting surface, harmful delaminations or cracks in the cell matrix may result for the following reason. After extrusion and especially during firing, the structure shrinks in a direction perpendicular to the extrusion axis. When the structure is supported on an open face, a drag is created between the supported open face and the supporting surface as the structure shrinks creating a resistance to shrinkage at the supported open face while shrinkage at the unsupported open face proceeds without any resistance. As a result, more shrinkage occurs at and closer to the unsupported open face; less shrinkage occurs at and closer to the supported open face; and substantially axially extending cracks are formed at the supported open face.

SUMMARY OF THE INVENTION

It is an object of this invention to provide an improved method of making extruded, monolithic honeycombed structures of sinterable material so as to substantially reduce the incidence and extent of delamination, cracking and/or slumping of the structure.

In accordance with this and other objects, the structure is maintained with the extrusion axis of the structure substantially horizontal. The structure is also oriented, at least during firing, such that series of connected cell walls extending from one side of the structure to another extend in a generally vertical direction with the minimum horizontal projection to provide vertical support for the cell walls.

In general, the vertical support for the cells is enhanced by orienting the cell walls such that the minimum horizontal projection of the aforesaid series is no greater than the minimum lateral projection, as defined hereinafter, of any other series of cells extending from one side of the structure to another. Where the horizontal and lateral projections are equal for different series of cell walls, the vertical support may be maximized by orienting the cell walls such that the average horizontal projection of cells walls in the generally vertically extending series is less than the average lateral projection of the cell walls in the other series. The vertical support is also enhanced by supporting the structure in a manner such that the horizontal width as measured perpendicular to the extrusion axis is at least equal to the vertical height of the structure.

In a preferred embodiment of the invention, the noted orientation of a sinterable honeycomb structure is maintained throughout the period of time for extruding, cutting, drying and firing to effect sintering. However, considerable benefit may be derived from the invention by the proper orientation of the structure for any substantial portion of that period of time which at least includes the firing step.

BRIEF DESCRIPTION OF THE DRAWINGS

FIGS. 3–8 represent positioning and orientation of different cell matrix configurations in accordance with this invention.

DETAILED DESCRIPTION OF A PREFERRED EMBODIMENT

Figure 1:
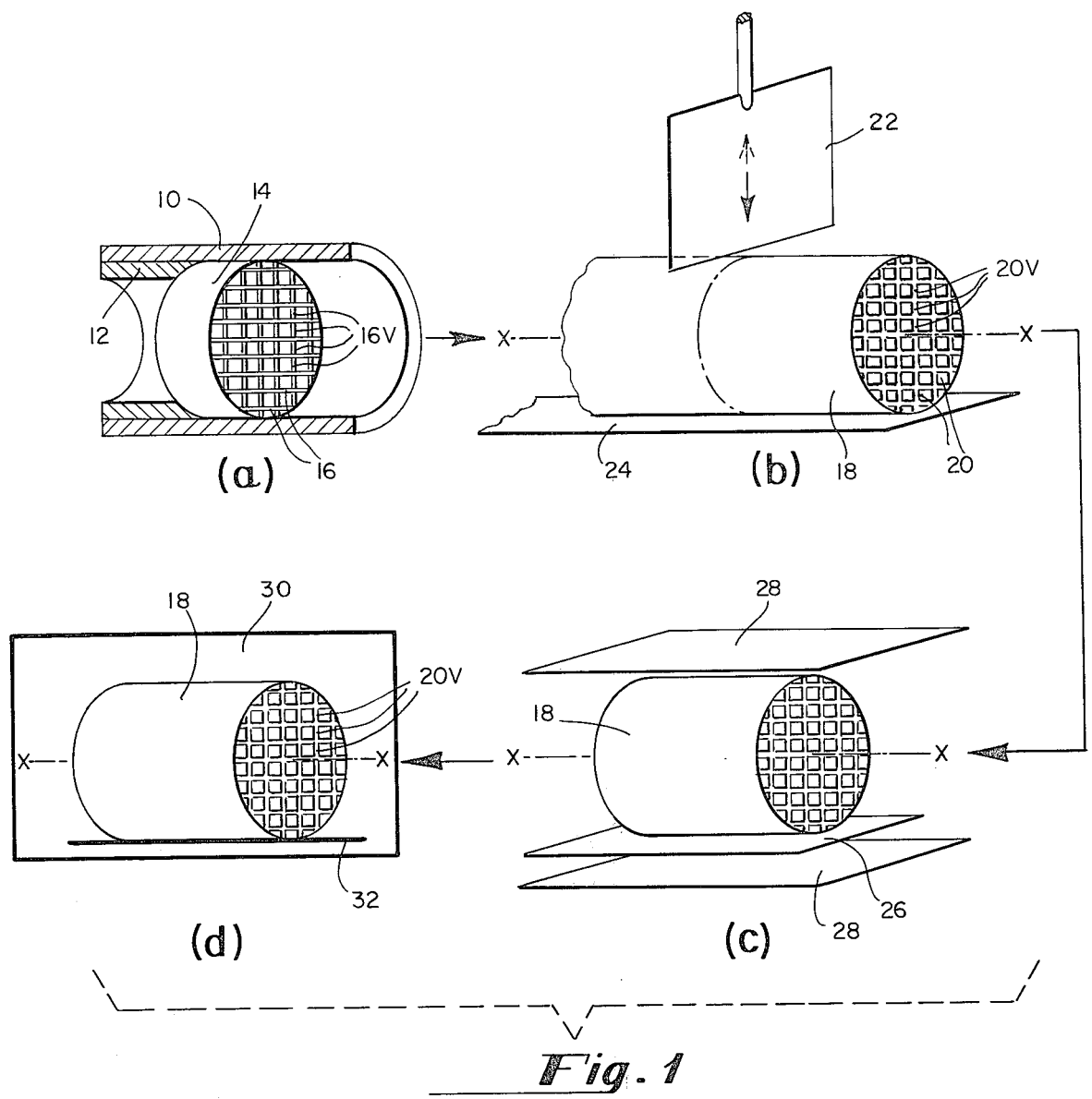
FIGS. 1(a–d) pictorially represent the invention utilized in four sequential steps for making extruded honeycombed structures.

In the preferred embodiment of the invention, a ceramic batch is extruded utilizing an extrusion die apparatus such as that shown in FIG. 1a. Briefly, the die apparatus comprises a support structure 10, an extrusion barrel 12 and an extrusion die 14. The die 14 includes a multiplicity of interconnected channels 16 through which the ceramic batch is extruded to form the monolithic honeycombed structure 18 shown in FIG. 1b.

In accordance with this invention, the die apparatus is positioned such that the extrusion axis XX of the structure 18 is generally horizontal as the structure is extruded through the die 14. Also, the channels 16 are oriented so as to provide vertical support for cells 20 of structure 18 during and immediately after extrusion. This vertical support is achieved by orienting the extrusion die apparatus in a manner so as to assure that the series of connected cell walls 20v are vertical without any horizontal projection. This in turn requires that the channels 16v which form the walls 20v be vertical.

In further accordance with this invention, the walls 20v of the structure 18 are maintained vertical during the cutting of the structure along a line substantially perpendicular to the axis XX of the structure as depicted in FIG. 1b. While the walls 20v are maintained vertical, a cutting surface or blade 22 reciprocates to divide the extruded structure into appropriate lengths. During this step, the extruded structure 18 is supported on one side along a horizontal supporting surface 24 which may comprise a moving surface which extends from the extrusion die of FIG. 1a to the blade 22.

In FIG. 1c, the extruded structure 18 which has been cut into an appropriate length is supported on a surface 26 with the axis XX horizontal and the walls 20v vertical while drying of the structure 18 proceeds in a dielectric drying apparatus having electrodes 28. In a dielectric drying system such as Chemetron Corporation's Thermex system (Model CP30B424, 27MC, 13KW), a drying time of 4.75 minutes is appropriate where the structure 18 is approximately 5 inches in diameter, 5 inches in length, contains approximately 31.5 percent water and the dielectric system is maintained at a power setting of 2.0 amps.

In still further accordance with this invention, the walls 20v of the structure 18 are maintained vertical during sintering in an oven 30 while the structure 18 is horizontally supported on a surface 32. While the particular furnace may vary, a gas fired furnace is particularly effective to fire the structure 18 with a composition to form cordierite where the temperature of the furnace is raised to a level of, for example, 1360°C. over a period of hours and then allowed to cool.

Measurements of structures similar to the structure 18 reveal that maintenance of the extrusion axis position and cell wall orientation shown in the positions of FIGS. 1(a–d) results in an out-of-sound condition due to slump equal to 0.044 inches after firing. If the structure is rotated 45° about the extrusion axis, the out-of-sound condition after firing is 0.207 inches due to the increase in the slump. It is therefore clear that the maintenance of vertically extending cell walls in accordance with this invention greatly reduces the tendency of the structure to slump.

Figure 2:
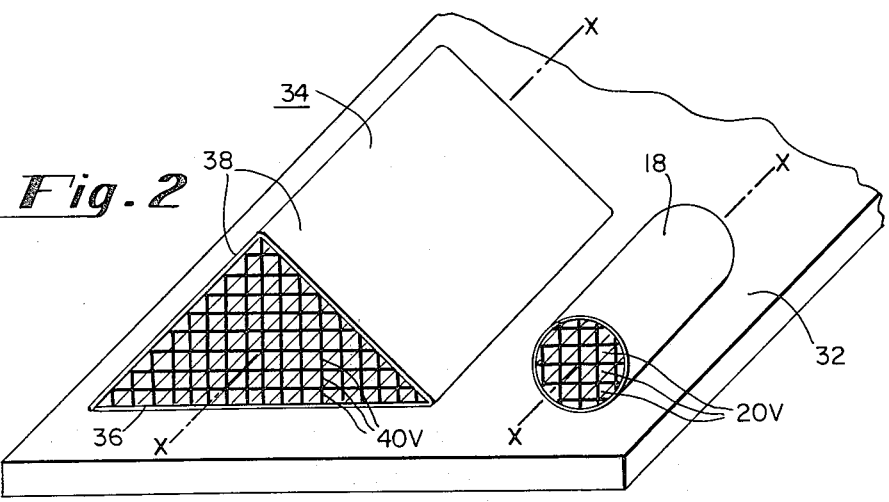
FIG. 2 is an isometric view of two different honeycombed structures supported and oriented in accordance with this invention.

As shown in FIGS. 1(a–d), the structure 18 is substantially cylindrical. It will of course be appreciated that other structure configurations fall within the scope of the invention. For example, FIG. 2 shows a green honeycombed structure 34 which is substantially triangular in crosssection side-by-side with the honeycombed structure 18 which is substantially circular in cross section. In both instances, the structures are shown as supported on the firing surface 32 such that the axis XX of the structure is substantially horizontal and parallel to the surface 30 and a series of connected cell walls 40v and 20v are oriented so as to be substantially vertical. In other words, series of cell walls of the structures are maintained substantially vertical regardless of the external configuration of the structure. Note also that the cell walls 40v are perpendicular to the supported surface 36 of the structure 34 and there are no cell walls perpendicular to the shorter exterior surfaces 38. This too is important since it allows the weight of the structure to be distributed over the largest possible area while still maintaining the cell walls 40v substantially vertical. Thus, where the structure is elongated in cross-section, its longest cross-sectional dimension perpendicular to the axis of extrusison is perpendicular to a series of cell walls which, when positioned in a generally vertical direction, will provide a minimum horizontal projection. In other words, the height of such a structure is less than the width of the structure when series of cell walls extending vertically through the structure have the minimum horizontal projection.

In the honeycombed structures of FIGS. 1(a–d) and 2, the cells of the matrix are substantially square in crosssection. Such a configuration permits series of connected cell walls to be maintained exactly vertical so as to maximize the vertical support in the honeycombed structure. However, due to the square nature of the cells, the vertical support could also be maximized by rotating the structure 90° so that the walls 20v are horizontal since the formerly horizontal walls become vertical as shown in FIG. 3 where the arrow indicates the vertical direction. However, it is often desirable to utilize different cell shapes which do not permit the same freedom in orientation if vertical support is to be maximized.

In FIG. 4, the honeycombed structure resembles brickwork where the cell shapes are rectangular in crosssection and staggered. In this particular cell matrix, the vertical support may only be maximized by maintaining the series of cell walls 44v substantially vertical as indicated by the arrow so as to achieve the minimum horizontal projection of the series. If the structure were to be rotated 90°, the vertical support of the structure would be impaired so as to increase the tendency of slump or sag, especially during firing, since the series 46 of cell walls, which would then extend generally in a vertical direction, would have a substantial lateral or horizontal projection L provided by the particular cell walls 44v which are included in the series 46.

In FIG. 5, the cells are shaped like "bow-ties" in cross-section. Vertical support for this particular cell matrix is maximized by orienting this series of cell walls 48v as to extend in a substantially vertical direction as indicated by the arrow. While there is a horizontal projection H of the series of cell walls 48v, that projection is minimized by orienting the cell walls in the position shown. Any slight or substantial rotation of the structure will increase that horizontal projection thereby diminishing the vertical support provided by the cell walls.

The cells in the structure of FIG. 6 are hexagonal in shape. Maximum vertical support for the cell structure is provided by orienting the cell walls such that the series of cell walls 50v extend substantially vertically as indicated by the arrow. Once again some horizontal projection H is provided by the series consisting of the cell walls 50v but that horizontal projection is less than the horizontal projection of any other series of connected cell walls extending from one side to the other side of the structure. If the structure were rotated 90° such that the series 52 of cell walls were to extend in a generally vertical direction, the lateral projection L of that series which would then become horizontal would be greater than the horizontal projection of the series consisting of cell walls 50v.

In FIG. 7, the cell matrix comprises diamond-shaped cells including cells 54 and 56 where the greatest widths of cells 54 are vertical whereas the greatest widths of the cells 56 are at an acute angle to vertical. In order to maximize the vertical support for the structure, cell walls 58v extend in a substantially vertical direction with the horizontal projection H as shown. If the orientation of the structure is modified by rotating the structure 90°, such that the series 60 of cell walls 58 extend in a generally vertical direction, vertical support for the structure would be somewhat diminished since the lateral projection L, which would then become horizontal, would be slightly larger than the horizontal projection of the series consisting of the cell walls 58v.

In FIG. 8, the cells are T-shaped. To maximize the vertical support for the structure, cell walls 62v must extend in a vertical direction. If the structure is rotated 90°, the series 64 of cell walls will provide a lateral projection L equal to the horizontal projection H for the series of cell walls 62v. However, the average horizontal displacement for the individual cell walls 62v is less than the average lateral displacement for the individual cell walls in the series 64 or any other series. Stated in other words, the ratio of the total horizontal projections to the total vertical projections for all cells in the vertical series is less than the ratio of lateral and longitudinal projections of any other series. Therefore, the maximum vertical support for the cell matrix is provided when the cell walls 62v extend in a generally vertical direction as shown in FIG. 8.

The method as described in the foregoing is particularly well-suited to making ceramic honeycombed structures where the extrusion batch placed in the extrusion barrel 10 comprises refractory metal oxides, water and an extrusion aid. The invention may also be utilized in the handling of other extruded structures in the green state such as those formed of powdered metals, cermets and similar sinterable materials where the term "green state" is defined, in accordance with customary usage in the ceramics field, as the condition of a body formed or molded from particulate sinterable material, but before it has been fired to cause sintering thereof. It will of course be appreciated that the steps succeeding the extrusion step as depicted in FIGS. 1(b) and 1(c) may be modified as desired for any particular green article. However, it is essential that the proper orientation always be maintained during firing as illustrated in FIG. 1(d) and FIGS. 2–8.

The extrusion die apparatus depicted in FIG. 1(a) has been described in very general terms. For further details of an appropriate die apparatus, reference is made to copending application Ser. No. 196,986 filed Nov. 9, 1971, now U.S. Pat. No. 3,790,654 (assigned to the assignee of this application), which is incorporated herein by reference.

This invention is especially applicable to extruded, thin-walled, monolithic honeycombed structures that generally have cell wall thicknesses in the range of about 4 to 50 mils and that may contain as few as about 50 or as many as about 900 cells per square inch of cross-sectional area of such structures perpendicular to the extrusion axis thereof.

Although a specific embodiment of the invention has been shown and described and various modifications suggested, other modifications and embodiments which fall within the true spirit and scope of the invention as set forth in the appended claims will occur to those of ordinary skill in the art.

What is claimed is:

1. A method of making a monolithic honeycombed structure having a matrix of walls forming a multiplicity of open-ended cells extending from one end of the structure to the other by extruding a plastically deformable and sinterable batch through an extrusion die to form a honeycombed structure and firing the extruded structure to effect sintering, the improvement comprising:

positioning the extrusion axis of the structure during firing so as to extend in a substantially horizontal direction; and orienting the cell walls during firing such that series of connected cell walls extending from one side of the structure to the other extend in a generally vertical direction with a minimum horizontal projection of said series.

2. The method of claim 1 wherein the orientation of said cells walls is such that the minimum horizontal projection of said series is no greater than the lateral projection of any other series of cell walls extending from one side of the structure to the other.

3. The method of claim 2 wherein the orientation of said cell walls is such that the average horizontal projection of said cell walls in said series is no greater than the average lateral projection of cell walls in any other series extending from one side of the structure to the other.

4. The method of claim 1 wherein the horizontal width of the structure as measured along a line perpendicular to the extrusion axis is at least as great as the vertical height of the structure as measured along a line perpendicular to the extrusion axis.

5. The method of claim 1 including the step of drying said structure after extruding and before firing, said positioning and orienting being utilized during drying.

6. The method of claim 5 including the step of cutting said structure transversely with respect to the extrusion axis after extruding and before drying, said positioning and orienting being utilized during cutting.

7. The method of claim 1 wherein said positioning and said orienting are utilized substantially throughout the interim beginning with extruding and terminating after firing.

* * * * *